United States Patent
DeLuca et al.

(10) Patent No.: US 11,412,349 B2
(45) Date of Patent: *Aug. 9, 2022

(54) SUPPRESSING NOTIFICATIONS BASED ON DIRECTED LOCATION ACTIVITY

(71) Applicant: International Business Machines Corporation, Armonk, NY (US)

(72) Inventors: Lisa Seacat DeLuca, Baltimore, MD (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/445,839

(22) Filed: Jun. 19, 2019

(65) Prior Publication Data

US 2019/0306661 A1    Oct. 3, 2019

Related U.S. Application Data

(63) Continuation of application No. 15/824,440, filed on Nov. 28, 2017, now Pat. No. 10,368,196.

(51) Int. Cl.
| | |
|---|---|
| *H04W 64/00* | (2009.01) |
| *H04W 4/02* | (2018.01) |
| *H04W 68/00* | (2009.01) |
| *H04W 4/14* | (2009.01) |

(52) U.S. Cl.
CPC ......... *H04W 4/023* (2013.01); *H04W 68/005* (2013.01); *H04W 4/14* (2013.01)

(58) Field of Classification Search
CPC ...... H04L 67/10; G08G 1/0133; G08G 1/015; G06F 17/30241; G06F 17/30569; H04W 4/021; H04W 4/02; H04W 4/206

USPC ............... 340/686.1; 705/44; 455/456.1, 420
See application file for complete search history.

(56) References Cited

U.S. PATENT DOCUMENTS

| | | |
|---|---|---|
| 9,191,918 B2 | 11/2015 | Dey et al. |
| 9,553,943 B1 | 1/2017 | DeLuca et al. |
| 10,368,196 B2 | 7/2019 | DeLuca |
| 2013/0191225 A1 | 7/2013 | Predescu et al. |
| 2014/0172973 A1 | 6/2014 | Zadorozny et al. |
| 2014/0206317 A1 | 7/2014 | Casey |
| 2015/0087274 A1 | 3/2015 | VanBlon et al. |
| 2016/0034961 A1 | 2/2016 | May et al. |

(Continued)

OTHER PUBLICATIONS

P. Mell, et al. "*The NIST Definition of Cloud Computing*", NIST Special Publication 800-145, Sep. 2011, Gaithersburg, MD.

(Continued)

*Primary Examiner* — Phuoc H Doan
(74) *Attorney, Agent, or Firm* — Stephanie Carusillo; George S. Blasiak; Heslin Rothenberg Farley & Mesiti PC

(57) ABSTRACT

Methods, computer program products, and systems are presented. The method computer program products, and systems can include, for instance: determining that a location based event has occurred, the location based event pertaining to a certain user computer device; identifying, based on the determining, a notification for sending to the certain user computer device, wherein the notification has an associated destination location; examining an activity level of the destination location; and based on the activity level exceeding a threshold, providing one or more output.

19 Claims, 10 Drawing Sheets

(56) References Cited

U.S. PATENT DOCUMENTS

| | | | |
|---|---|---|---|
| 2016/0316322 A1 | 10/2016 | Gillen | |
| 2016/0357782 A1* | 12/2016 | Jones | H04W 4/021 |
| 2018/0367483 A1* | 12/2018 | Rodriguez | H04L 51/046 |
| 2019/0005812 A1* | 1/2019 | Matus | G08G 1/0112 |
| 2019/0166458 A1 | 5/2019 | DeLuca | |

OTHER PUBLICATIONS

List of IBM Patent and/or Patent Applications treated as related for U.S. Appl. No. 16/445,839, filed Jun. 19, 2019, dated Oct. 30, 2019.
Non-final Rejection, U.S. Appl. No. 15/824,440, filed Nov. 28, 2017, dated Jun. 27, 2018.
Applicant's Response to Non-Final Rejection, U.S. Appl. No. 15/824,440, filed Nov. 28, 2017, dated Sep. 27, 2018.
Final Rejection, U.S. Appl. No. 15/824,440, filed Nov. 28, 2017, dated Dec. 26, 2018.
Applicant's Response to Final Rejection, U.S. Appl. No. 15/824,440, filed Nov. 28, 2017, dated Feb. 19, 2019.
Notice of Allowance, U.S. Appl. No. 15/824,440, filed Nov. 28, 2017, dated Mar. 11, 2019.

* cited by examiner

SUPPRESSING NOTIFICATIONS BASED ON DIRECTED LOCATION ACTIVITY

CROSS-REFERENCE TO RELATED APPLICATION

This application is a continuation of U.S. application Ser. No. 15/824,440, filed Nov. 28, 2017, entitled, "Suppressing Notifications Based on Directed Location Activity," which is incorporated by reference herein in its entirety.

BACKGROUND

Location based services (LBS) are software services that use location data to control functionality of computer systems. LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WiFi based locating technologies, and other technologies. One example of an LBS is a location based messaging services wherein notifications and other messages to users can be in dependence on the respective locations of the users.

SUMMARY

Shortcomings of the prior art are overcome, and additional advantages are provided, through the provision, in one aspect, of a method. The method can include, for example: determining that a location based event has occurred, the location based event pertaining to a certain user computer device; identifying, based on the determining, a notification for sending to the user certain computer device, wherein the notification has an associated destination location; examining an activity level of the destination location; and based on the activity level exceeding a threshold, providing one or more output.

In another aspect, a computer program product can be provided. The computer program product can include a computer readable storage medium readable by one or more processing unit and storing instructions for execution by one or more processor for performing a method. The method can include, for example: determining that a location based event has occurred, the location based event pertaining to a certain user computer device; identifying, based on the determining, a notification for sending to the certain user computer device, wherein the notification has an associated destination location; examining an activity level of the destination location; and based on the activity level exceeding a threshold, providing one or more output.

In a further aspect, a system can be provided. The system can include, for example a memory. In addition, the system can include one or more processor in communication with the memory. Further, the system can include program instructions executable by the one or more processor via the memory to perform a method. The method can include, for example: determining that a location based event has occurred, the location based event pertaining to a certain user computer device; identifying, based on the determining, a notification for sending to the certain user computer device, wherein the notification has an associated destination location; examining an activity level of the destination location; and based on the activity level exceeding a threshold, providing one or more output.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
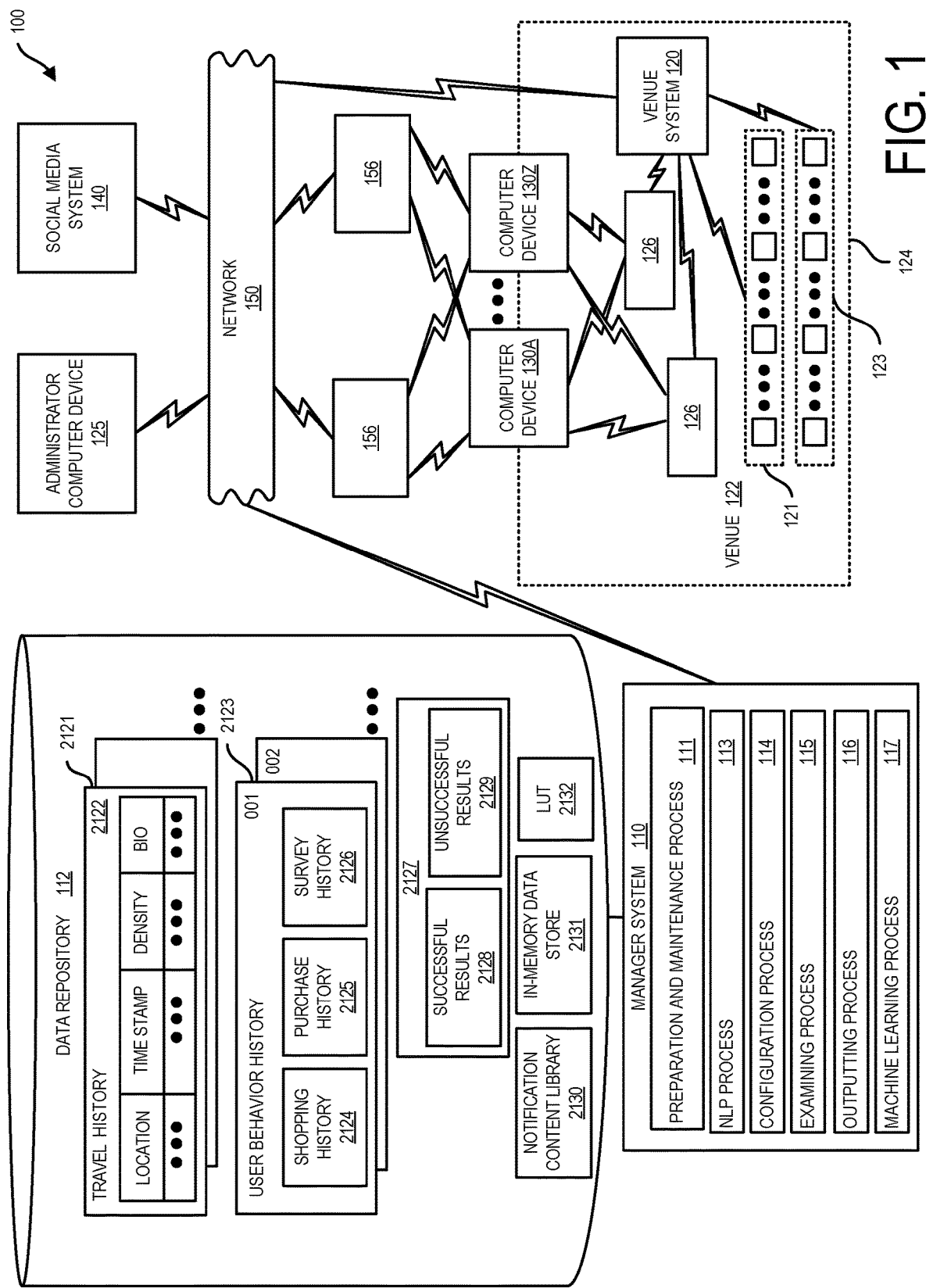
FIG. 1 depicts a system having manager system and computer devices according to one embodiment.

System 100 for use in supporting location based services is shown in FIG. 1. System 100 can include manager system 110 having an associated data repository 112, venue system 120 disposed in a venue 122, a plurality of user computer devices 130A-130Z, and social media system 140. System 100 can also include camera system 121 and display system 123, in communication with venue system 120. Camera system 121 can be an in-venue camera system and can include a plurality of fixed-mount camera equipped computer devices distributed at different locations throughout venue 122. Display system 123 can be an in-venue display system and can include a plurality of fixture mounted displays e.g. overhead displays distributed at different locations throughout venue 122. Manager system 110, venue system 120, administrator computer device 125, user computer devices 130A-130Z, and social media system 140 can be in communication with one another via network 150. System 100 can include numerous devices, which may be computing node based devices, connected by a network 150. Network 150 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

In one embodiment manager system 110 can be external to and remote from venue system 120 social media system 140, administrator computer device 125, and to each of the one or more user computer device 130A-130Z for use by users of system 100. In one embodiment manager system 110 can be co-located with venue system 120 and/or social media system 140. In one embodiment manager system 110 can be co-located with administrator computer device 125, and/or one or more user computer device 130A-130Z. Administrator computer device 125 can be used by human administrator users of system 100. User computer devices 130A-130Z can be used by human users of system 100.

Referring further to FIG. 1, venue system 120 can be located in venue 122 that is delimited by venue geographical border 124 that specifies the geographical coordinate area occupied by venue 122. In one embodiment, an organizational entity that operates manager system 110 can be in common with the organizational entity that operates venue system 120 and venue 122. Venue 122 can be a retail venue in one embodiment. Venue system 120 can be disposed in venue 122 defined by geographical boundary 124. User computer devices 130A-130Z can be mobile computer devices, moveable between locations, internal and external to venue 122, and thus are shown in FIG. 1 as being partially disposed within geographical boundary 124 and partially disposed external to geographical boundary 124. User computer devices 130A-130Z can be wireless computer devices that can be connected to network 150 by alternate radio communication protocols. For example, user computer devices 130A-130Z can connect to network 150 by connection nodes 156. Connection nodes 156 can be connection nodes that facilitate connection to a cellular communication network. User computer devices 130A-130Z can also be connected to network 150 via connection nodes 126. Connection nodes 126 can be provided by IEEE 802.11 access points of a WiFi wireless network provided by an operator of venue system 120, in which operator can be the operator of venue 122 and manager system 110.

In one embodiment, each user computer device 130A-130Z can be associated to a certain user. In one embodiment, each user of system 100 is a registered user of a retail vendor that operates a plurality of venues such as venue 122. Users having records stored in user behavior history area 2123 of data repository 112 can be registered users of manager system 110 and of the vendor e.g. can be customer loyalty card holders of the vendor who receive customer loyalty cards in exchange for data regarding themselves.

Each of the different users of user computer devices 130A-130Z can be associated to a different user. Regarding one or more user computer device 130A-130Z, a user computer device of one or more user computer device 130A-130Z in one embodiment can be a computing node based device provided by a client computer, e.g. a mobile device, e.g. a smartphone or tablet, a laptop, smartwatch, or PC that runs one or more program e.g., including a web browser for viewing web pages.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system.

Embodiments herein recognize that a variety of problems arise in the realm of computer networks operating in an area occupied by a plurality of users capable of communicating with a network. Embodiments herein recognize that on the occurrence of events commonly experienced by multiple users at a common time, the multiple users may make concurrent demands on the network to overload the network and frustrate the function of relied on services. Embodiments herein recognize that on outputting of notifications by the network to multiple users traffic patterns can be affected in significant ways giving rise to health risks, safety risks, and infrastructure building layout designed concerns.

Manager system 110 can run various processes including preparation and maintenance process 111, Natural Language Processing (NLP) process 113, configuring process 114, examining process 115, and outputting process 116. Manager system 110 can also run machine learning process 117.

Manager system 110 can run preparation and maintenance process 111 to populate and maintain data of data repository 112 for use by various processes run by manager system 110 including e.g. examining process 115.

Manager system 110 can run NLP process 113 to process data for preparation of records that are stored in data repository 112 and for other purposes. Manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameter can include topic segmentation to identify several topics within a message. Topic analysis can apply a variety of technologies e.g. one or more of Hidden Markov Model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (that is to say, the emotional state of the author when writing), or the intended emotional communication (that is to say, the emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." In one embodiment, determining sentiment can include use of a scaling system whereby words commonly associated with having a negative, neutral or positive sentiment with them are given an associated number on a −10 to +10 scale (most negative up to most positive).

Manager system 110 can run configuring process 114 to configure parameters of a location based messaging service, e.g. based on administrator user configuration defined data that is specified using an administrator user interface. The location based messaging service can be, e.g. a service that outputs a notification to a certain user computer device based on the user computer device experiencing a location based event e.g. a breach event or a dwell event. As set forth herein, an administrator user interface can permit an administrator user to define for a location based messaging service a time period for which a location based messaging service is active and parameters of a location of interest (e.g. in the case of a geofence coordinate locations, perimeter size and shape, in the case of a zone, the zone identifier) actions associated with an event detected for e.g. notifications and/or process initiations, events triggering the providing one or more output, e.g. a breach and/or a dwell.

Manager system 110 can run examining process 115 for determining an activity level of a destination location associated to a notification which destination location can be a destination location associated to the notification. A destination location can be a location associated to a notification identified responsively to a location based event being detected. Manager system 110 in one embodiment can activate NLP process 113 to examine a text based notification and to extract a location specified therein.

Manager system 110 can use a lookup table (LUT) 2132 stored in data repository 112 for determining a coordinate location based on a friendly name of a location specified in a text based notification, which location friendly name can be determined via NLP processing. For example, LUT 2132 can associate the friendly location name "shoe department" to coordinate location values, e.g. the coordinates (x,y) specifying the center point of the shoe department or coordinate location values defining a perimeter of a two dimensional area of a shoe department. In one embodiment, LUT 2132 can be expanded so that keywords and topics can be associated to coordinate location values as well as location friendly names. For example, the keyword "shoes" or the topic "shoes" can be associated by LUT 2132 to coordinate location values that specify points or areas in physical space within the shoe department, Manager system 110 can run NLP process 113 to determine a topic of an identified notification. Machine learning technologies can be provided to auto-populate LUT 2132 over time. For example, manager system 110 can maintain a record of notifications and can monitor traffic resulting from each notification. Based on there being identified a destination that is associated to a notification, the notification and the destination specified by coordinate location values can be recorded into LUT 2132 as an associated notification and destination location pair. A next time a notification according to the LUT-recorded notification is identified, manager system 110 can look up the notification's associated coordinate location from LUT 2132 to determine a destination location associated to the notification. Manager system 110 can determine that an identified notification matches a recorded location in LUT 2132 by it having a dissimilarity score relative to the notification that is below a threshold. Manager system 110 can include user interface functionality (e.g. with user interface 500 of FIG. 5) that allows an administrator user to define any desired notification—coordinate location value association in LUT 2132.

Manager system 110 running examining process 115 can apply a multifactor function of weighted factors for determining an activity level of a destination location. The factors can include such factors as device count factor, a movement scoring factor, a motion scoring factor, and a person count factor. Manager system 110 running examining process 115 can include determining that an activity level for a destination location has exceeded a threshold and can include determining a custom threshold, custom determined for each user of system 100. A custom threshold for a certain user can be based on the particular certain user's ability to tolerate crowded locations or locations characterized by persons exhibiting substantial body motion. For determining a custom threshold, data repository 112 in travel history area 2121 can store information for each user of the user's location history over time, and can store, e.g. data indicating population density surrounding the user at specific timestamped points in time and biometrics data, e.g. heartrate data associated with the locations of the user over time.

Manager system 110 running outputting process 116 can include manager system 110 providing one or more output based on an activity level of a destination location exceeding a threshold which threshold can be custom determined for each user. The one or more output can include, e.g. an output to suppress (e.g. prevent or delay) sending an identified notification for sending to the certain user, an output to initiate an alternate process such as a process for monitoring for alleviation of the high activity condition, a process for monitoring biometrics of the user to which the identified notification is intended, or a process for sending an alternate notification to the certain user directing a user to an alternate location, e.g. to avoid a high crowded area and for better distribution of a persons over an area.

Manager system 110 running machine learning process 117 can perform monitoring of performance of a location based messaging service responsively to location based event, e.g. a breach, a dwell, or a and/or can perform monitoring of performance of a location based service responsively to determining that an activity level of a destination location has exceeded a threshold.

In accordance with machine learning process 117, manager system 110 can examine results obtained by performance of examining process 115 and based on the examining can adjust examining process 115.

Manager system 110 can run outputting process 116 to manage the providing of outputs based on, e.g. high activity determinations and/or location based events. Provided outputs can include, e.g. notifications to users and/or communicate to initiate performance of processes, e.g. processing involving processing one or more outputs.

Data repository 112 can include travel history area 2121. Travel history area 2121 can store travel history data for each of a plurality of users of system 100, e.g. user 001, user 002, and so on. Travel history data stored in travel history area 2121 can include for each of several users, a table 2122. The table 2122 for each user can have such columns as a location column specifying the locations traveled of a user throughout history of times a timestamp column specified a time associated with each location, a density column specifying the population density of the location of the user at each location traveled to by the user throughout history, and a biometric column specifying a biometric reading of the user at the location. Location data for the user can be sampled at a selected sampling rate, e.g. once per second, once per minute, once per hour, etc. depending on the configuration of system 100 as specified by an administrator user. For providing of location data that specifies a location of users of system 100 over time, system 100 can be configured to provide locating services. Locating services can be e.g. control plane based, self-reported based, local range based or a combination of the noted types. In one embodiment, locating services provided by system 100 can locate a user computer device of user computer devices 130A-130Z using e.g. GPS based locating services, located services based on processing of signals received by connection nodes 156 (cellular network), locating services based on processing of signals received by connection nodes 126 (LAN) or a combination of such services. Locating services can additionally or alternatively be image recognition based. For example, manager system 110 can be configured to subject video data obtained from camera system 121 to facial recognition and can identify users based on the performed facial recognition, and can also perform locating of recognized users based on the known locations of cameras of camera system 121 which can be fixed mount, as well as the known view directions of the cameras of camera system, and determined positions of features within video data frames.

Data repository 112 can also include user behavior history area 2123 which can store data on the behavior history of each of a plurality of users e.g. user 001, user 002, and so on. User behavior history area 2123 in the case users are users of a retail venue can include shopping history area 2124, purchase history area 2125, and survey history area 2126. In shopping history area 2124 of behavior history area 2123, there can be stored a plurality of shopping history records. Each record specifying a prior shopping history activity of the user, e.g., web browsing history of the user can be stored in shopping history area. In area 2125, there can be stored records of purchase histories records of purchases by the user. Each record can specify information of a different purchase by the user. In survey history area 2126, there can be stored records of surveys completed by the user. Shopping history data stored in area 2124 can include a record of a customer's shopping behavior e.g. data on whether the customer tends to shop online or in retail venues and the amount of times associated with online or in-store shopping. For example, in shopping history area 2124 there can be stored data records indicating the average time which a customer maintains an online browsing session and/or data that indicates the average length of time that a customer remains in a retail venue after arrival at a retail venue, and data records indicating cost and types of product browsed either on-line or in venue, and data records indicating breaches of beacon zones of a venue 122. Topics for products subject to shopping activity can be extracted by running of NLP process 113 and associated to data records stored in area 2124. Data of purchase history area 2130 can include a record of purchases that the customer has made over time and include various sub-classifications relating e.g. to cost and types of products purchased. Topics for products purchased can be extracted by miming of NLP process 113 and associated to data records stored in area 2125. In survey history area 2126 there can be stored survey history data e.g. can store records of surveys that have been completed in the past by the customer over time regarding preferences of the customer e.g. likes and dislikes. Topics for products commented on in surveys can be extracted by running of NLP process 113 and associated to data records stored in survey history area 2126.

Data repository 112 in some embodiments can include in-memory data store 2131 for storing content of identified notifications while processing is performed to filter a sending of a notification. Filtering processes herein can potentially suppress an identified notification from being sent.

Figure 2:
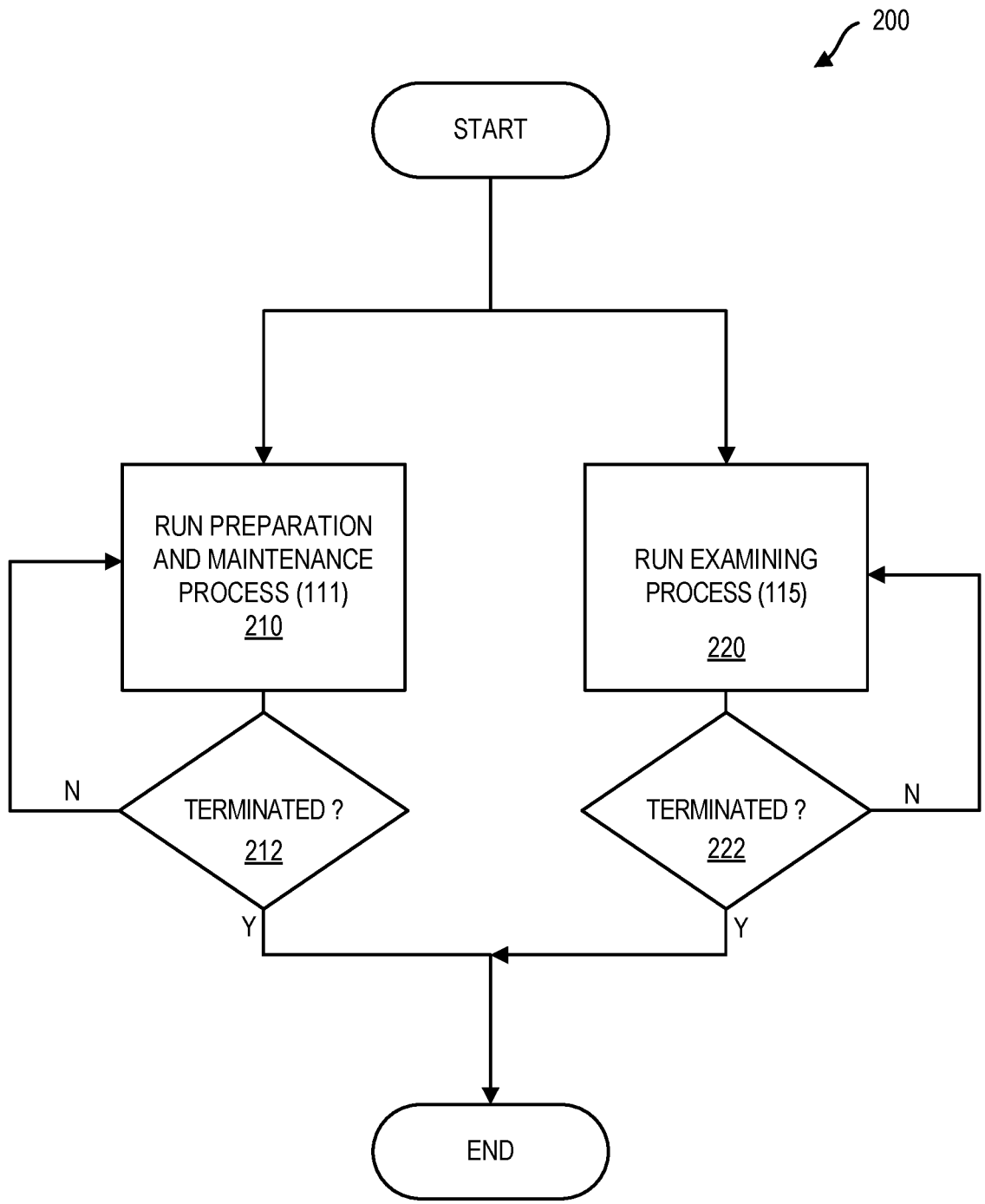
FIG. 2 is flowchart illustrating a method that can be performed by a manager system according to one embodiment.

FIG. 2 depicts a flowchart of illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 including data of travel history area 2121, shopping history area 2124, purchase history area 2125, and survey history area 2126. Manager system 110 can run preparation and maintenance process 111 until process 111 is terminated at block 212.

At block 220, manager system 110 can run examining process 115 to output one or more notification to one or more user. For support of running of examining process 115 iteratively, manager system 110 can be running e.g. configuring process 114, outputting process 116, and machine learning process 117 iteratively. Manager system 110 can run examining process 115 until examining process 115 is terminated at block 222. Manager system 110 can run preparation and maintenance process 111 and examining process 115 concurrently and can run each of process 111 and process 115 iteratively.

For performance of preparation and maintenance process 111, manager system 110 can be configured to automatically process, e.g. including by running of NLP process 113, messages that are generated by system 100. In one embodiment manager system 110 for performance of block 210 can instantiate structured data records in areas 2121, 2123, 2127, 2131, and 2132 that are adapted for use by examining process 115.

For instantiation of records into travel history area 2121 manager system 110 can monitor data messages output by location services of system 100.

For instantiation of records into user behavior history areas 2124, 2125, and 2126 manager system 110 can be configured so that manager system 110 automatically monitors for "actions" of a customer user and stores an action record for each action in one or more of area 2124, 2125, and 2126. An action can be a shopping action e.g. a browsing session on a venue website or an in-venue visit. Records for such actions can be stored in area 2124. Actions can include purchases e.g. on line or in venue. Records for such actions can be stored in area 2125. Actions can include completed surveys which can completed on line. Records for such actions can be stored in area 2126. A record for an action instantiated by manager system 110 can include e.g. a Customer ID, ID=001, and classification information return by subjecting a message generated by performance of the action to NLP processing by running of NLP process 113, e.g. topic and/or sentiment classifications of generated messages. Data repository 112 can store such action records in addition to or in place of underlying unstructured message content. In one embodiment, data repository 112 can be configured to initialize responsively to being populated with a threshold amount of data having specified attributes.

Figure 3:
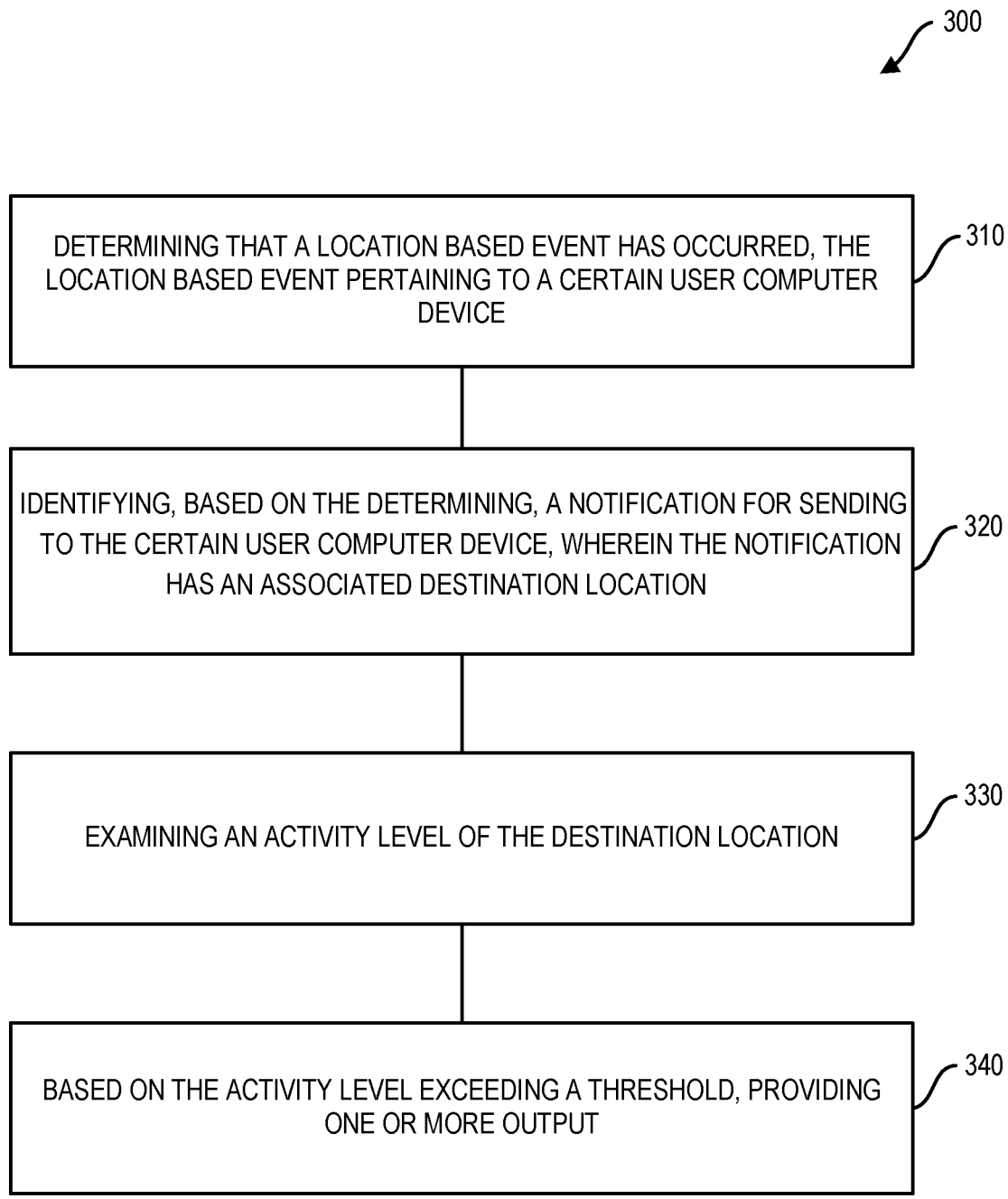
FIG. 3 is flowchart illustrating a method that can be performed by a manager system according to one embodiment.

A method 300 for performance by manager system 110 is illustrated with reference to FIG. 3. At block 310 manager system 110 can perform determining that a location based event has occurred, the location based event pertaining to a certain user computer device. At block 320 manager system 110 can perform identifying based on the determining a notification for sending to the certain user computer device, wherein the identified notification has an associated destination location. At block 330 manager system 110 can perform examining an activity level of the destination location. At block 340 manager system 110 can perform based on the activity level exceeding a threshold, providing one or more output.

At block 1301, user computer devices 130A-130Z can send registration request data for receipt by manager system 110 at block 1101. Users of user computer devices 130A-130Z can register their respective user computer devices 130A-130Z to participate in a location based messaging service, in which messages are delivered to user computer devices based on a location of the user computer device. One example is a customer support service, wherein users of user computer devices 130A-130Z are customers of an entity such as a retail or restaurant organization having numerous venues throughout a geographical area, may wish to better communicate with its customers by way of a location based messaging service.

In one use case recognized herein, the service may recognize that a patron has breached a location of interest e.g. geofence or zone. Based on such recognition the service may send a push notification notifying the patron of a promotion, which notification if followed will result in the patron travelling to a destination location.

Registration request data sent at block 1301 for receipt at block 1101 can include, e.g. name and contact information of a user of a computer device as well as other information in facilitating messaging of the user by the manager system 110, e.g. messaging service, account information to allow messages to be received e.g. text based notifications to be received by a customer. On receipt of registration request data at block 1101, manager system 110 can register a user and can send at block 1102 location based messaging software to user computer devices 130A-130Z, from which registration requests have been received.

Location based messaging software, received by user computer devices 130A-130Z at block 1302, can include software that allows respective user computer devices 130A-130Z to locally on their respective hardware platforms determine that a location based event has occurred. An event can include, e.g. that a computer device has breached a location of interest (e.g. geofence or zone) or that a dwell has occurred. Events can include e.g. breaches, dwells. A dwell can be regarded to have occurred if a computer device remains within a location of interest for a specified time. With a location based messaging software installed on a computer device, a computer device is able to determine that a location based event has occurred. On the determining that a location based event has occurred, a computer device can send a notification to manager system 110, which can then respond by providing one or more output, e.g. such as an output notification to the computer device.

At blocks 1201 and 1303 various data sources of system 100 can send data for receipt by manager system 110 at block 1103. For example, at block 1201, venue system 120 can send to manager system 110 for receipt at block 1103, activity data e.g. data for use and determining that a certain location is active e.g. has activity above a threshold. Activity data can include e.g. user position information and other information for use and determining of activity e.g. camera image data e.g. from an in-venue camera. At block 1303, user computer devices 130A-130Z can send activity data e.g. including user position data and other data for use in determining an activity level of a location. At block 1104, manager system 110 can send receive data received at block 1103 to data repository 112 for storage by data repository 112. Blocks 1201 and 1303 as well as blocks 1103 and 1104 can be iterative i.e. can be performed iteratively throughout the lifetime of system 100.

Figure 5:
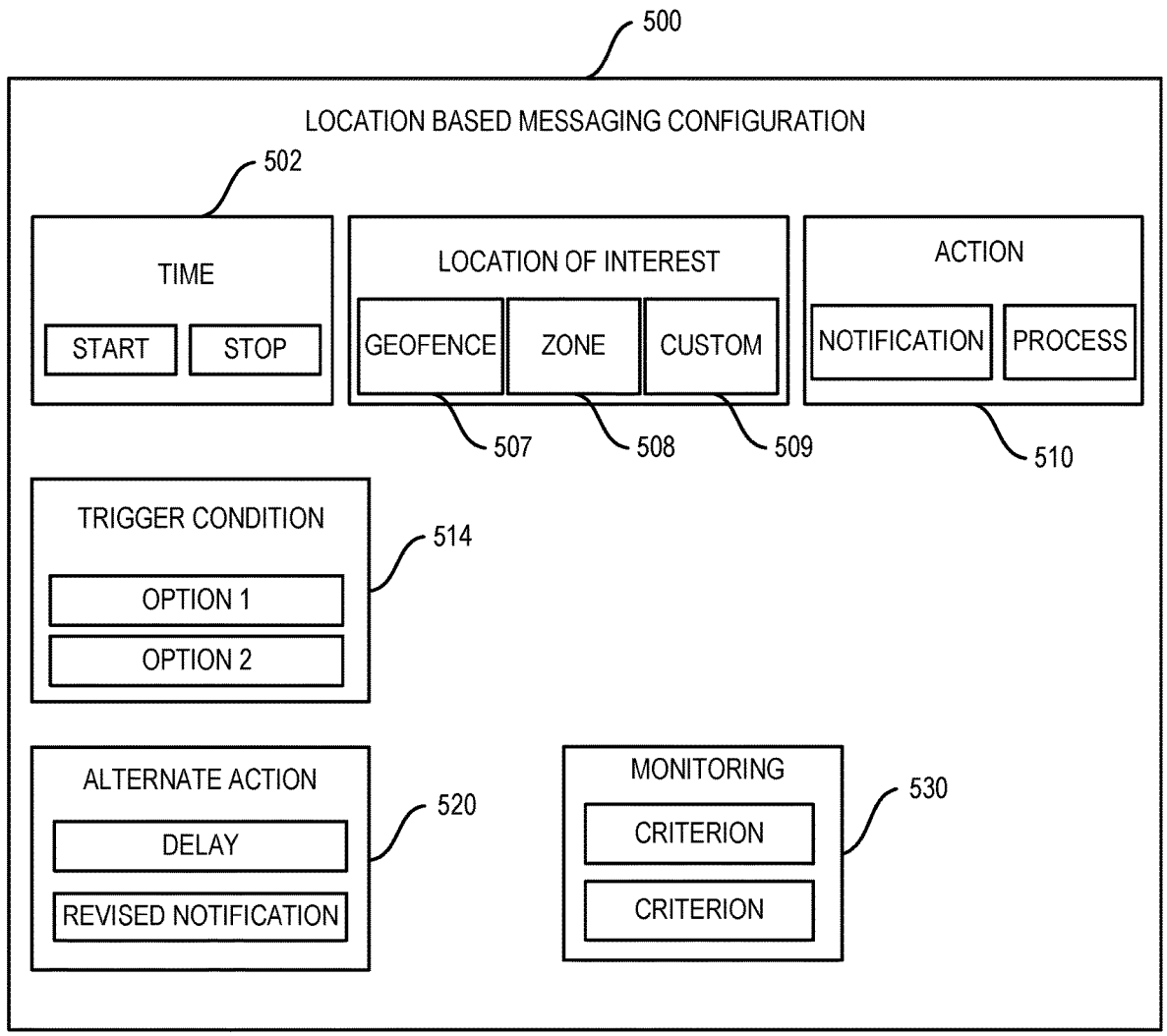
FIG. 5 depicts an administrator user interface according to one embodiment.

At block 1251, administrator computer device 125 can send configuration data for receipt by manager system 110 at block 1105. Configuration data sent at block 1251 can include data that configures manager system 110 to output one or more location based message. The user interface 500, for use by an administrator user, establishing location based messaging service configuration data as shown in FIG. 5. Using area 502, an administrator can specify a start time and a stop time of a location based messaging service. Using area 506, an administrator user can specify a location of interest, e.g. using area 507 a geofence that can be characterized by location coordinates that specify a perimeter or using area 508 a "zone" which can be characterized by having beacon for use in detecting proximate computer devices, or using area 509 a custom configured location of interest. Using area 510, an administrator user can specify an action to be performed on the occurrence of a location based event. The one or more action can include e.g. a notification and/or a process. A notification can include a text based message sent via a messaging system to a user computer device. An action can include an automated process e.g. a machine learning process in which performance of system 100 is monitored e.g. using one or more sensor. Using area 514, an administrator user can specify a trigger condition. A trigger condition can be e.g. a location based event that triggers the providing of one or more output. A trigger condition can include e.g. a user computer device breaching a geofence or a zone and/or a dwell event wherein the user computer device remains within an area of a geofence or a zone for more than a threshold period of time.

At block 1106, manager system 110 can determine that configuration data specifying parameters of a new location based messaging service has been received. On the determination that such configuration data has been received, manager system 110 at block 1107 can send data of the configuration data to user computer devices 130A-130Z for receipt by the user computer devices 130A-130Z at block 1304. With the data of the configuration data installed and recorded on the user computer devices 130A-130Z, user computer devices 130A-130Z can be enabled to determine that a location based event specified by the configuration data has occurred, e.g. a breach of a location of interest (e.g. geofence or zone) or a dwell event (e.g. geofence or zone).

At block 1306, user computer devices 130A-130Z can determine that a specified condition associated with the location based messaging service have been satisfied. At block 1307, user computer devices 130A-130Z for which the specified condition has been satisfied, can send an event communication for receipt by manager system 110 at block 1108. In one embodiment manager system 110 performing determining that a location based event has occurred can include receiving a communication sent at block 1307. It will be understood that the sending of such communications at block 1307 by various computer devices of user computer devices 130A-130Z, can occur asynchronously i.e. at different points in time. In another embodiment manager system 110 determining that a location based event has occurred can include manager system 110 executing event detection locally e.g. on a computing node of manager system 110 which in one embodiment can be external and remote from user computer devices 130A-130Z. For example, manager system 110 can be configured to execute location based event logic to determine that a geofence breach event has occurred, that the geofence dwell event has occurred, that a zone breach has occurred, that a zone dwell has occurred. In a further example, manager system 110 can subject received video data from camera system 121 to facial recognition processing and can identify based on the processing that certain user of system 100 has breached a defined location of interest which may be defined using custom area 509 of administrator user interface, or has dwelled at the defined location of interest.

On receipt of an event communication from a certain computer device at block 1307 or manager system 110 otherwise determining that a location based event has occurred, manager system 110 can proceed to block 1109, where manager system 110 can perform identifying of a notification for sending to the certain computer device based on the configuration data sent at block 1251. Identifying can include, e.g. identifying notification content (e.g. text content) from a notification content library 2130 of data repository 112, identifying content (e.g. text) for personalizing notification content, and/or identifying address information specifying the user's computer device.

The notification identified at block 1109 can have an associated destination location. The destination location herein can be regarded as the location which the user receiving the notification will travel to if proceeding according to the notification. The destination location can be expressly referenced in text content of an identified notification, e.g. "Travel to the Shoe Department to Receive a Reward." However, the destination location need not be expressly referenced. For example, in one embodiment, text content of the identified notification can merely include such text content as, for example, of "Great Deal on Shoes until 5 PM."

In one use case scenario, a location based messaging service can be configured so that on breach of a location of interest, a user is sent a notification. The notification can be e.g. a text based promotion promoting a product without expressly referencing a location. The notification can be e.g. a text based notification that expressly references a destination location. In one embodiment, the notification can be e.g. a text based notification that, according to the configuration data received at block 1103 promotes the user's favorite product category at the venue. The venue can be e.g. retail store having departments e.g. shoe department, sports department, toys department, electronics department, and café, and the user's favorite product category can be determined by examining profile data of the user e.g. as determined by the user's shopping history, purchase history, and/or survey data history. In one embodiment, the notification can be non-text-based.

At block 1110 in some embodiments, manager system 110 can store content of the identified notification formatted at block 1109 into in-memory data store 2131 of data repository 112. Content of an identified notification stored into in-memory data store 2131 can include, e.g. identifying data (e.g. pointer or indexing data) facilitating retrieval of notification content, notification text content copied from notification content library 2130, personalized text content of the identified notification, addressing data, and the like. With content of the identified notification stored into in-memory data store 2131 of data repository 112 manager system 110 can perform processing to determine whether one or more criterion are satisfied to filter a sending of the notification.

At block 1111, manager system 110 can make multiple queries at data repository 112, as indicated by query received and respond block 1122 performed by data repository 112. Processing at block 1111 can include processing to determine an activity level at a destination location associated to an identified notification which may have content associated hereto stored at in-memory data store 2131. For determining an activity level at a destination location, processing at block 1111 can include processing to determine a destination location associated to a notification. For example, if the identified notification stored identified at block 1109 includes the text content "go to shoe department to receive rewards" the location for which activity level can be determined at block 1111 is the shoe department location. In the case the identified notification is the notification "go to café to receive free coffee" the location subject to activity level determination at block 1111 is the location of the café. For providing such determinations manager system can activate NLP processing to perform applicable sentence segmentation and classification processing. As noted relative to LUT 2132 (FIG. 1) manager system 110 can be configured so that manager system 110 can determine a destination location associated to a notification, even where a location is not expressly referenced in the text of the notification. For example, manager system 110 at block 1111 can look up from LUT 2132 coordinate location values based e.g. on keywords and/or topics that can be extracted from a notification by running of NLP process 113. Where manager system 110 recognizes a match between an identified notification and coordinate location value in LUT 2132, manager system 110 can automatically associate the notification to the specified coordinate location value.

At block 1112 manager system 110 can determine if the determined activity level at block 1111 is greater than a threshold. For determining an activity level at a location e.g. a location of a venue, manager system 110 at block 1111 can apply the formula set forth below in Eq. 1.

$$S = F_1 W_1 + F_2 W_2 + F_3 W_3 + F_4 W_4 \qquad \text{(Eq. 1)}$$

Where "S" is the overall scoring parameter scoring the activity level according to a scoring function based on the sum of weighted factors, where $F_1$ is an activity level scoring factor based on a number of devices at the specified location, a number of different locating services can be applied for locating computer devices e.g. WiFi based location services, beacon based locating services ultrasound based locating services, GPS based location services, and/or cellular based locating services, where $F_2$ is a computer device movement scoring factor, where $F_3$ is a motion scoring factor, where $F_4$ is a person count factor, and where $W_1$-$W_4$ are weights associated with the various factors, associated with the various factors $F_1$, $F_2$, $F_3$, and $F_4$.

Regarding factor $F_1$ locations of various user computer devices of user computer devices 130A-130Z can be determined using various location services, e.g. WiFi based location services, beacon based location services, ultrasound based location services, GPS based location services, and/or cellular based location services. A specified location can be allocated a relatively high activity score, where there are many computer devices about the specified locations and can be allocated a relatively lower score according to factor $F_1$ where there are few computer devices about the location.

Regarding factor $F_2$, factor $F_2$ can be a factor based on movement of devices at the specified location over time. A specified location characterized by having computer devices remaining in a relatively stationary position about the specified location can be allocated a relatively low score according to factor $F_2$ and a specified location characterized by having computer devices having locations that vary significantly about the specified location over time a location can be allocated relatively high scores according to factor $F_2$.

According to factor $F_3$, factor $F_3$ is a motion factor. Factor $F_3$ in one embodiment can be based on an accelerometer output of computer devices. A specified location characterized by computer devices about the specified location indicating significant body motion by their respective users can be allocated relatively high scores under function $F_3$ whereas specified locations characterized by computer devices about the specified location indicating relatively little body motion by their respective user can be allocated a relatively lower score under factor $F_3$. "Movement" herein can be distinguished by "motion", e.g. "movement" can refer to a user changing coordinate locations whereas "motion" can refer to body actions of users that are independent of location coordinate change (e.g. a person at a fixed coordinate location doing jumping jacks will register a higher motion score than a person standing still at a fixed coordinate location).

Factor $F_4$ can be a person counting factor determined e.g. using image recognition processing based on camera data obtained using e.g. a plurality of cameras of camera system 121 (FIG. 1) distributed throughout a venue. Image recognition can be useful for counting persons not countable based on computer device use e.g. can be used to count persons who are not registered users and can be used to count persons who are not computer device users. Devices that can be counted, according to factor $F_4$ can include computer devices of registered users and of unregistered users using various location services.

Embodiments herein recognize that users can experience stress and/or anxiety when encountering large crowds or people, or smaller crowds populated by persons exhibiting significant body motion. Embodiments herein attempt to avoid situations where a user is directed to a location that is highly populated or otherwise qualifying as a high activity location. Activity scoring according to Eq. 1 can determine an activity level associated with a location. Highly populated areas can be allocated high activity scores according to Eq. 1 and in some instances according to Eq. 1, a high activity score can be achieved by way of persons exhibiting significant motion. In the case that a high activity level is determined for a location, a notification directing a user to visit the location may be suppressed and in some use cases substituted for an alternate notification directing the user to an alternate location.

At block 1111, manager system 110 can determine that an activity level for a given location is greater than a threshold. The threshold can be in one embodiment, a pre-determined threshold e.g. configured using configuration data sent at block 1251. In another embodiment, manager system 110 can apply a threshold at block 1112 that is an adaptive threshold that is custom provided for the user for whom a notification is being processed and subject to filtering. Embodiments herein recognizes that different users can have different tolerances for crowds or being in proximity to persons exhibiting significant motion. Some users may enjoy location characteristics by crowds or other attributes of high action, while other users may be more likely to experience stress in proximity of locations that are crowded or locations otherwise having high activity levels.

Figure 6:
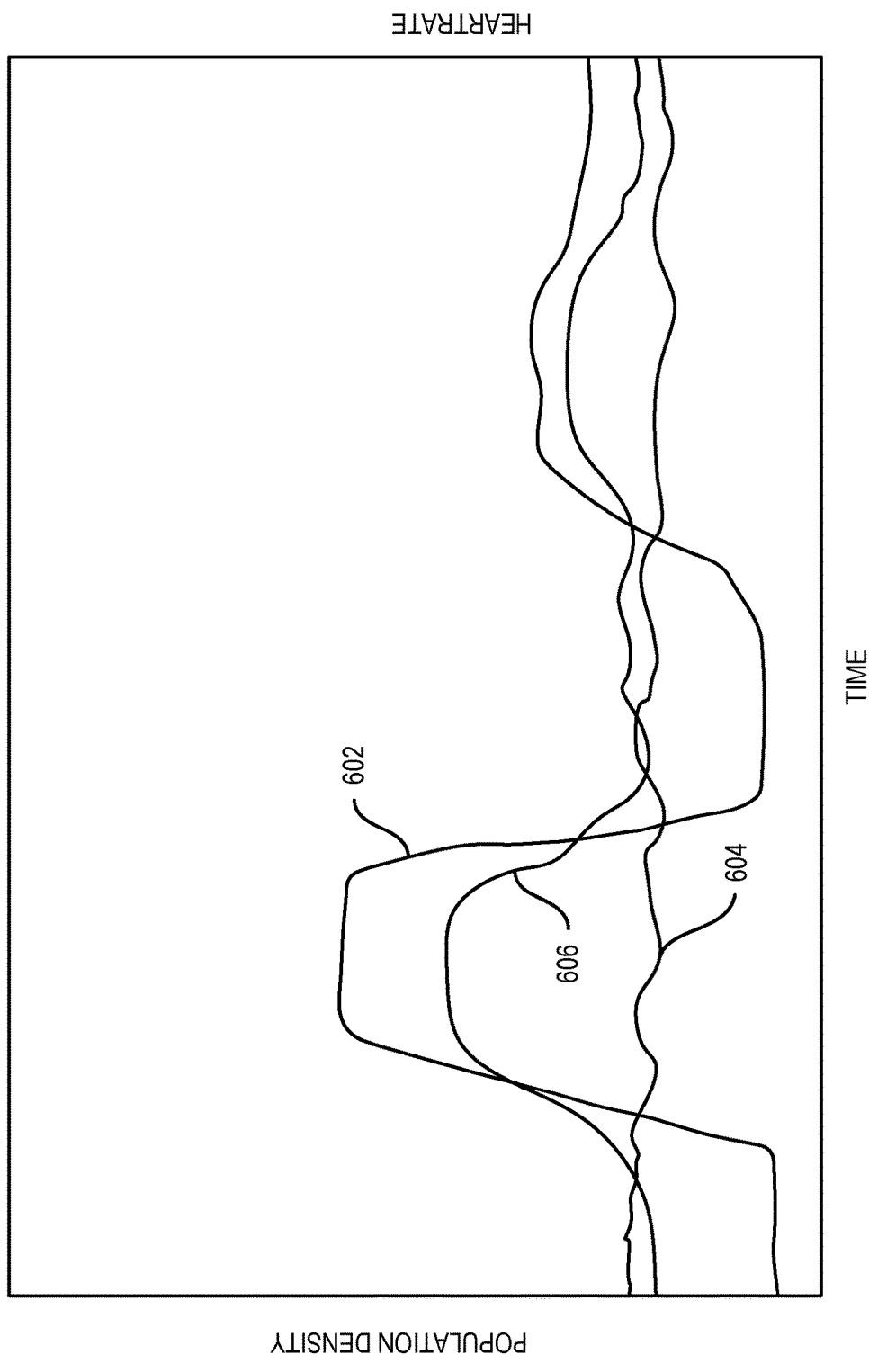
FIG. 6 depicts illustrative biometric data of first and second users traveling through areas of changing population density.

In one embodiment, for determining the threshold applied at block 1112, manager system 110 can determine the correlation factor between a heartrate of a computer device user and a crowd factor of the computer device user over time. The crowd factor of a user device can be a measure of the population density surrounding the computer device over time. FIG. 6 illustrates data of two users travelling together between locations having low population density and high population density. Plot 602 is a population density of predetermined areas surrounding the first and second users. It is seen from plot 602 that the users travel from a first low population density location to a higher population density location, and then to a lower population density location, and again to a relatively high population density location. Plot 604 is a plot of the first user's heartrate through the travel between locations, and plot 606 is the second user's heartrate through the travel between various locations. Heartrates of the first and second users can be determined using a heartrate detector sensor device associated with user computer devices of user computer devices 130A-130Z of the respective first and second users. User computer devices 130A-130Z of the various users can be provided in one embodiment by smartwatches.

Referring to FIG. 6, the first user having a heartrate depicted by plot 604 can be allocated a low heartrate to population density correlation score and the second user having a heartrate depicted by plot 606 can be allocated a relatively high heartrate to population density correlation score. Referring to FIG. 6, it can be observed that the first user (plot 604) is relatively tolerant to crowds and the second user (plot 606) is relatively intolerant to crowds. At block 1112, a user having a relatively low heartrate to population density correlation score can be allocated a relatively high threshold, whereas a user having a relatively high heartrate to population density score can be allocated a relatively low threshold at block 1112. Thus, the activity level required for triggering alternate processing (block 1114) can be greater for users who are relatively tolerant of crowds or other high activity, and the activity level triggering alternate processing (block 1114) can be relatively low for users who are relatively intolerant of crowds or other activity. In another embodiment, manager system 110 can use a default threshold when insufficient data has been developed for a user custom threshold. In one embodiment, manager system 110 can uniformly apply a default threshold for all user.

With further reference to the activity level not exceeding a threshold, manager system 110 can proceed to block 1113 to provide one or more output at block 1113. The one or more output at block 1113 can include an output to send the identified notification identified at block 1109 for receipt by a certain computer device at block 1306. The one or more output at block 1113 can include an output notification to venue system 120 for receipt by venue system 120 at block 1202, e.g. can notify the venue to increase staffing, in the case the determined activity level was within a prespecified range of the threshold. One or more output at block 1113 can include activation of machine learning process 116 as is set forth in greater detail herein.

Referring again to block 1112, manager system 110, based on a determining that an activity level is greater than a threshold, can provide one or more output. The one or more output can include e.g. one or more output to suppress the identified notification identified at block 1109 and/or one or more notification to activate an alternate process as set forth in reference to block 1115 and/or one or more output as referenced at block 1115. At block 1114, manager system 110 can perform alternate processing to determine an action that it is an alternate to an action including sending an identified notification identified at block 1109. Aspects of the alternate processing may have been predefined via administrator user control. For example, referring again to administrator user interface 500, as shown in FIG. 5, an administrator user can use area 520 to establish alternate action parameters. For example, according to one example of an alternate action an administrator user can establish a delay so that at block 1114, manager system 110 simply delays the sending of identified notifications until a time that the activity level at the location of interest to which a user is detected falls to a level less than the threshold applied at block 1112. Thus, in one embodiment, manager system 110 at block 1114 can iteratively monitor an activity level at the location to which a user is directed and can monitor for the condition that the activity level has fallen below the applied threshold at block 1112. On the determination that the activity level has fallen below the applied threshold, manager system 110 can proceed to block 1115 in the described embodiment to provide one or more output. An output can include the sending of the previously identified notifications identified at block 1109 which may have associated content stored at in-memory data store 2131.

Referring again to the administrator user interface 500 as shown in FIG. 5, an administrator user can use area 520 to configure parameters for sending of a revised notification in the case a high activity destination location is detected. For example, if the administrator user using area 510 has specified that a notification promote a user's favorite product category, the revised notification configured using area 520 can be configured so that on the condition that a high activity destination location is detected, the user can send a notification promoting the user's "second favorite" product category within a venue. For determining the user's favorite locations within a venue, manager system 110 can examine data of behavior history area 2123 of data repository 112 to determine preferences of the user and can match those preferences to different store specified locations, e.g. shoe department, sports department, toy department, electronics department, and/or café. Manager system 110 can determine a ranking of the user's "favorite" venue locations, e.g. first preference: café, second preference: sporting goods. Where an originally identified notification identified at block 1109 does not specify the user's favorite product category, data of behavior history area 2123 can nevertheless be used for providing an alternate notification. For example, the alternate notification can promote the user's favorite product category in such a scenario if a destination location associated to the alternate notification is not in conflict with the destination location associated to the original notification identified at block 1109.

Referring again to alternate processing block 1114, alternate processing at block 1114 in one embodiment can include the alternate processing to send a notification to a user to direct the user to an alternate location within a venue, that is an alternate to the location directed by the identified notification identified at block 1109. For example, in reference to the previously described example, manager system 110 can consult the previously generated list of preferred venue locations of a user and can substitute the most preferred location originally determined and specified in the identified notification identified at block 1109 and can identify the second most preferred location in the previously generated list. Manager system 110 can then proceed to block 1115, to provide one or more output based on the alternate processing performed at block 1114. The one or more output can include an alternate notification sent to the certain user for receipt by the certain user at block 1307. For outputting such alternate notification manager system 110 can provide the alternate notification to specify the user's second most preferred venue location in reference to the described example. An output that can be provided by manager system 110 at block 1115 can include a notification to venue system 120 for receipt by venue system at block 1203. Such notification can include a notification prompting a venue operator to increase staffing at the destination location referenced in the output notification output to the certain computer device.

In one embodiment, alternate processing at block 1114 can include activating processing to determine activity levels of alternate destination locations throughout venue 122 that are different from and spaced apart from the destination location associated to the originally identified notification identified at block 1109. The activity level determining can be according to the activity level determining as set forth herein. Based on a determination of activity level at one or more alternate destination locations different from the destination location, manager system 110 can qualify an output of alternate notification in a number of ways. For example, manager system 110 in one embodiment can provide an alternate notification at block 1115 based on a determination that an activity level of an alternate destination associated to the alternate notification is below a threshold. Such threshold can be predetermined or dynamically determined. Manager system 110 in one embodiment can provide an alternate notification at block 1115 so that an activity level of an alternate destination location associated to the alternate notification is a lowest activity level of a plurality of alternate destination locations subject to activity level checking. In the described embodiments an alternate destination location associated to an alternate notification can be according to the determining of a destination location associated to a notification.

An output that can be provided by manager system 110 at block 1115 can include an output to initiate notifications provided by display system 123 having displays distributed at different locations throughout venue 122. Based on such output, manager system 110 can coordinate notifications being displayed by different displays throughout a venue so that patrons within a venue are guided to avoid the location determined at block 1112 to have an activity level exceeding a threshold. For example, each display distributed throughout a venue can be controlled to display a notification prompting general travel in the venue to avoid the location determined at block 1112 to have an activity level exceeding a threshold. The displays of display system 123 can guide a patron for whom an identified notification is identified at block 1109 as well as other patrons. Displays that are more proximate the location determined at block 1112 to have an activity level exceeding a threshold that are more prominent e.g. can directly notify patrons to avoid the location determined at block 1112 to have an activity level exceeding a threshold (e.g. "Do Not Go to the Shoe Department If You Want To Avoid a Crowd"), whereas displays less proximate the location determined at block 1112 to have an activity level exceeding a threshold can provide notifications that are less direct (e.g. "Great Sale in Housewares"). For alternate processing involving use of display system 123, a default threshold can be applied at block 1112. Thus, a user having a particularly low tolerance for substantial activity will not trigger a global guiding of patrons by display system 123. In one embodiment manager system 110 can apply two thresholds at block 1112: one for the user for whom a notification is identified at block 1109 and one for controlling activation of the described global guiding provided by display system 123. Thus, users who are particularly tolerant of substantial activity locations can receive their identified notification at block 1306 even though global guiding by display system 123 is activated so that patrons in general are guided to avoid the destination location associated to the identified notification.

One or more output provided at block 1113 or alternatively block 1115 can include process initiation outputs to initiate processes. Process initiation outputs can be provided in the alternative to or to supplement a notification. Process initiation output can include activating machine learning process 117 (FIG. 1) performed by manager system 110. According to an activated machine learning process 117, activated at block 1116 one or more sensor output can be monitored for determining performance of the current location based messaging service. In one embodiment, the overall performance of the location based messaging service can be scored. The scoring can be used as an input in the performance of subsequent location based messaging services provided by system 100. The performance score of a current location based messaging service can be determined based on one or more criterion. The one or more criterion can be configured by an administrator user using area 530 of user interface 500. The one or more criterion can include e.g. one or more of the following criterion, (A) respond check criterion: did the user respond to the notification (originally identified or alternate), (B) dwell check criterion: did the user dwell at the destination location specified in the notification (originally identified or alternate), (C) biometric criterion: what are the biometric effects on the user to the notification (originally identified or alternate), and (D) ratings criterion: are there further indicators of user satisfaction, e.g. positive survey results, positive postings, e.g. as determined by NLP processing of user social media posts.

For the (A) respond check criterion, manager system 110 can monitor location data of the computer device receiving a notification to determine whether the user of the computer device responded to the notification. The location data can be provided by any location service, e.g. GPS based, cellular service based, WiFi based and/or camera system based. For performing monitoring according to (B) dwell check criterion, manager system 110 can also monitor location data provided by any available location service that provides a location of the computer device receiving the notification (originally identified or alternate). According to the (C) biometric criterion, manager system 110 can monitor an output of a biometric sensor of the computer device receiving the notification. The biometric sensor can be e.g. a heartrate sensor. According to the biometric criterion in one embodiment, manager system 110 can ascertain whether prompting a user to travel to specified location has had a negative impact on the user, e.g. which might be indicated by an increased heartrate, or alternative to whether the prompting of a user to travel to a specified location has had a positive biometric effect, e.g. as might be indicated by a stable heartrate. For performing monitoring according to the (D) ratings criterion, manager system 110 can examine prespecified ratings forms, e.g. survey forms as might be provided by venue operator or can derive ratings information by processing of unstructured data, e.g. in the form of social media posts which might be subject to structuring using NLP processing for determination of ratings information.

Manager system 110 as set forth in reference to the flowchart of FIG. 2, can be supporting multiple location based services simultaneously and dozens to hundreds to thousands of location based services over time. Manager system 110 with use of machine learning process 117 can be configured to grower "smarter" over time, by recording and using results of previously performed location based services. In results area 2127 of data repository 112, manager system 110 can store results associated with each rendered location based messaging service. The result of each rendered location based messaging service can include results associated to a plurality of different users who are provided notifications according to the particular service. A score for a particular location based messaging service can be based on an aggregate of scores for individual users according to the messaging service. Manager system 110 can store for each rendered location based service the weight profile according to Eq. 1 used for providing the notification. Weights $W_1$-$W_4$ of Eq. 1 can be varied within valid ranges over time, and over time, manager system 110 can bias the weights $W_1$-$W_4$ in accordance with weights of the previously rendered location based messaging services providing successful results, as may be recorded in successful results area 2128 of results area 2127. That is, for determining the weights $W_1$-$W_4$ of Eq. 1, manager system 110 can select weights in favor of values producing successful results and in a manner to avoid weight values producing unsuccessful results, as may be recorded in unsuccessful results area 2129 of results area 2127. As additional location based messaging services are deployed, system 100 includes additional performance data with each rendered service supplementing the stored performance data stored in results area 2127 continually refining, revising, and improving selected weights for use in Eq. 1 to improve the likelihood of satisfied users resulting from performance of the location based messaging service.

Machine learning process performed by system 100 can include processes other than processes described with respect to machine learning block 1116 in relation to monitoring of performance of a location based messaging service. It should be highlighted that several processes performed by manager system 110 can include data queries of historical data stored in data repository 112. One example is the custom threshold used for determining whether an activity level associated with a destination location has exceeded a threshold. As described herein, the threshold can be a custom threshold designed on a custom basis for each user. The custom threshold designed for each user can be based on the individual user's ability to tolerate locations having substantial activity. As set forth herein, a user's ability to tolerate locations having substantial activity can be gauged using a biometric output, e.g. a heartrate of the user. It should be highlighted that the ability of manager system 110 to determine a user's ability to tolerate substantial activity locations and to therefore determine an accurate threshold for the user can increase over time as additional data stored in data repository 112. The determinations made by manager system 110 as to the activity location tolerance of the user can be expected to improve according to a principle of machine learning. For example, the effect of an atypical reaction of a user to a substantial activity location by a particular user might dominate a determination that is based on a small data set, but with a larger data set, i.e. when the corpus of the database grows, the anomalous effect with be smoothed by the presence of the additional data.

Certain embodiments herein may offer various technical computing advantages, involving computing advantages to address problems arising in the realm of computer networks and particularly computer networks operating to provide services to a plurality of users capable of communicating with the network. In one aspect, on the occurrence of events commonly experienced by multiple users at a common time, the multiple users may make concurrent demands on the network to overload the network and frustrate the function of relied on services. In accordance with that aspect embodiments herein can intelligently reduce potential network loading events by intelligent management of notifications to users. Embodiments herein can also address traffic flow concerns for example by reducing a risk that users will collide or bottleneck within certain areas within or about a venue on receipt of a notification. By intelligent outputting of notifications embodiments herein can impact venue and venue area traffic patterns in positive ways by reduction of health risks, safety risk, and by increasing traffic flow support under the constraint of a certain infrastructure venue layout design. Embodiments herein can dynamically adjust or "throttle" notifications output to in venue users to reduce network overloading risk while at the same time addressing concerns of in venue traffic congestion. Machine learning processes can be performed for increased accuracy and for reduction of reliance on rules based criteria and thus reduced computational overhead. In one embodiment, a data repository can be leveraged which can be populated and managed by multiple processes including proactive data populating process invoking automated search engines searching of multiple data sources. For enhancement of computational accuracies, embodiments can feature computational platforms existing only in the realm of computer networks such as artificial intelligence platforms, and machine learning platforms. Embodiments herein can employ data structuring processes, e.g. employing Natural Language Processing (NLP) for transforming unstructured data into a form optimized for computerized processing. Embodiments herein can provide results and advantages that are not possible or practical without use of components of a technical computing environment, such as processes leveraging instantaneous queries of a data repository storing user behavior history data to develop multifactor probability determinations. Embodiments herein can examine data from diverse data sources such as data sources that process radio signals for location determination of users. Embodiments herein according to one artificial intelligence (A) platform can, in order to drive cognitive decision making, examine location data as well as biometric data to derive activity scores for a specified location, and to customize computer network and user interactions based on user's particular biometric history. Embodiments herein can include artificial intelligence processing platforms featuring improved processes to transform unstructured data into structured form permitting computer based analytics and predictive decision making. Embodiments herein can include particular arrangements for both collecting rich data into a data repository and additional particular arrangements for updating such data and for use of that data to drive artificial intelligence decision making.

Figure 7:
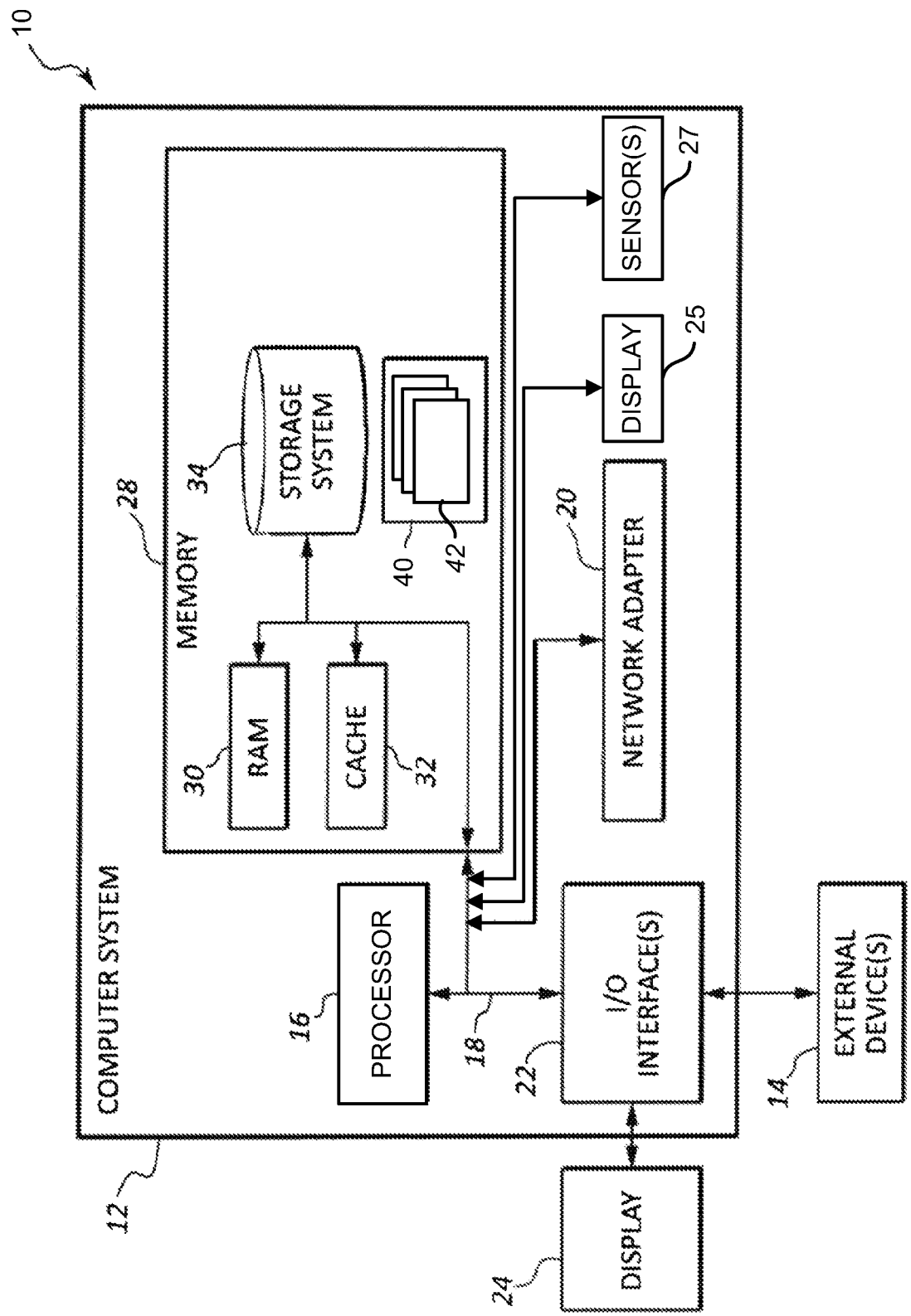
FIG. 7 depicts a computing node according to one embodiment.
Figure 8:
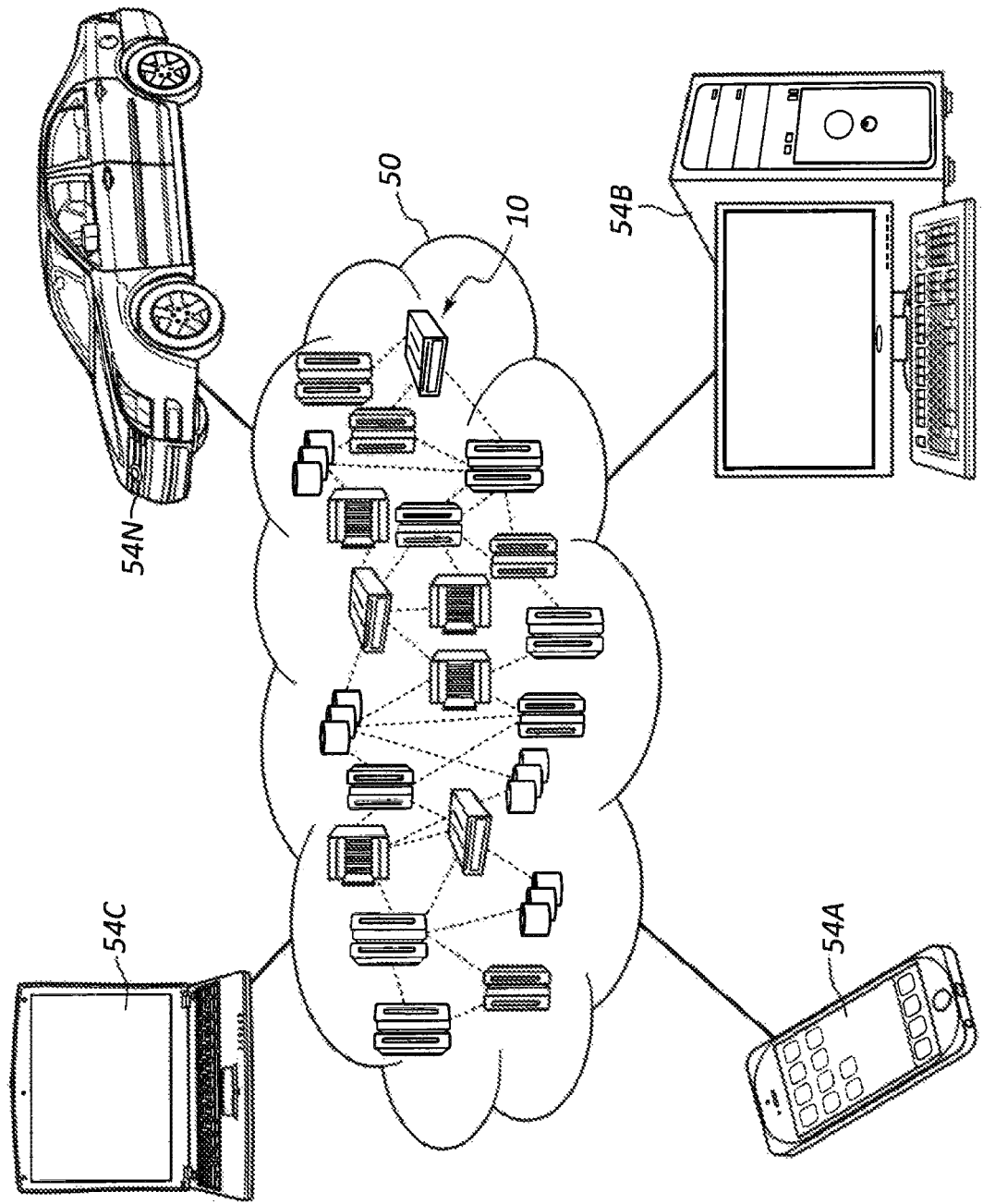
FIG. 8 depicts a cloud computing environment according to one embodiment.
Figure 9:
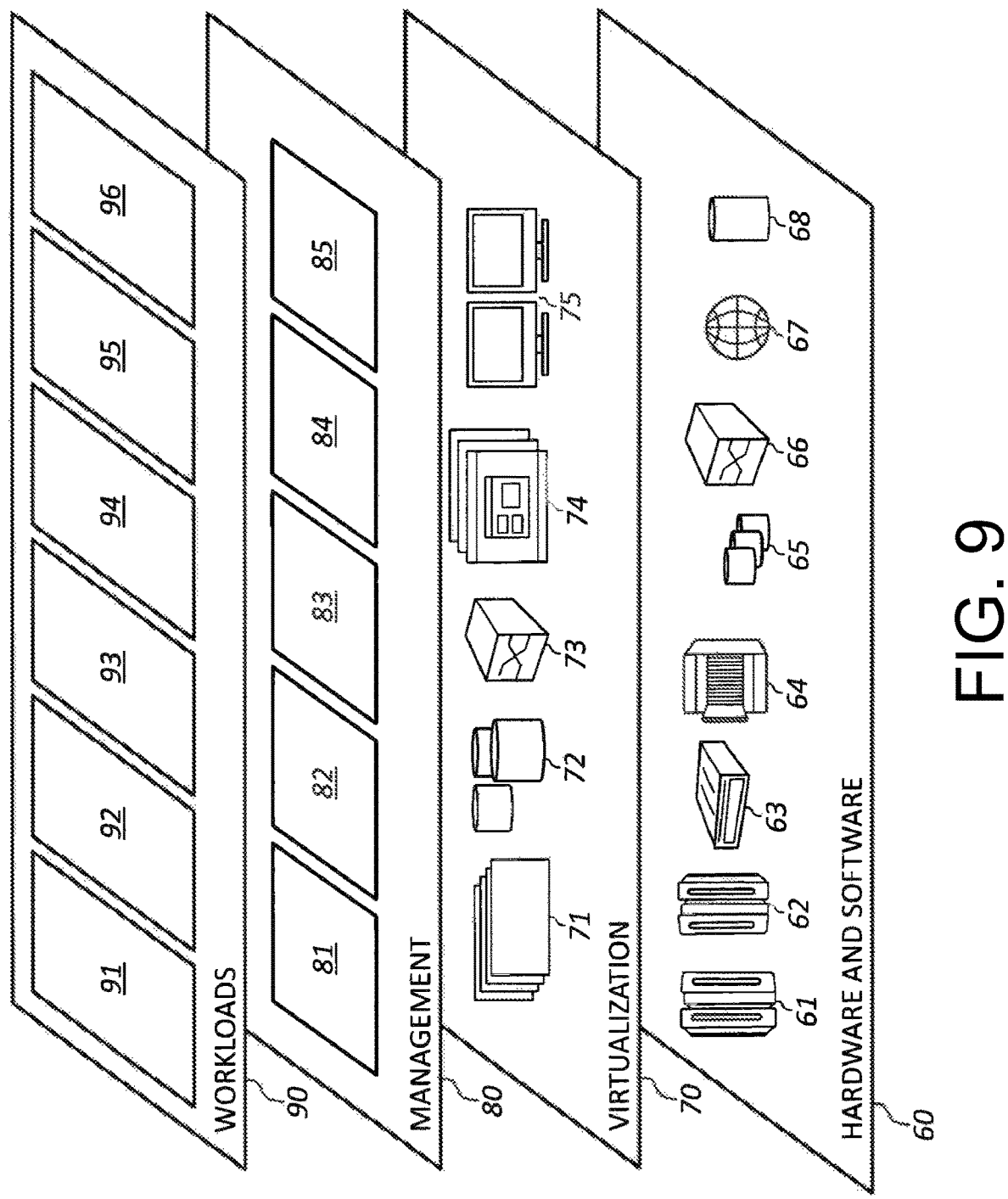
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

Figure 4A:
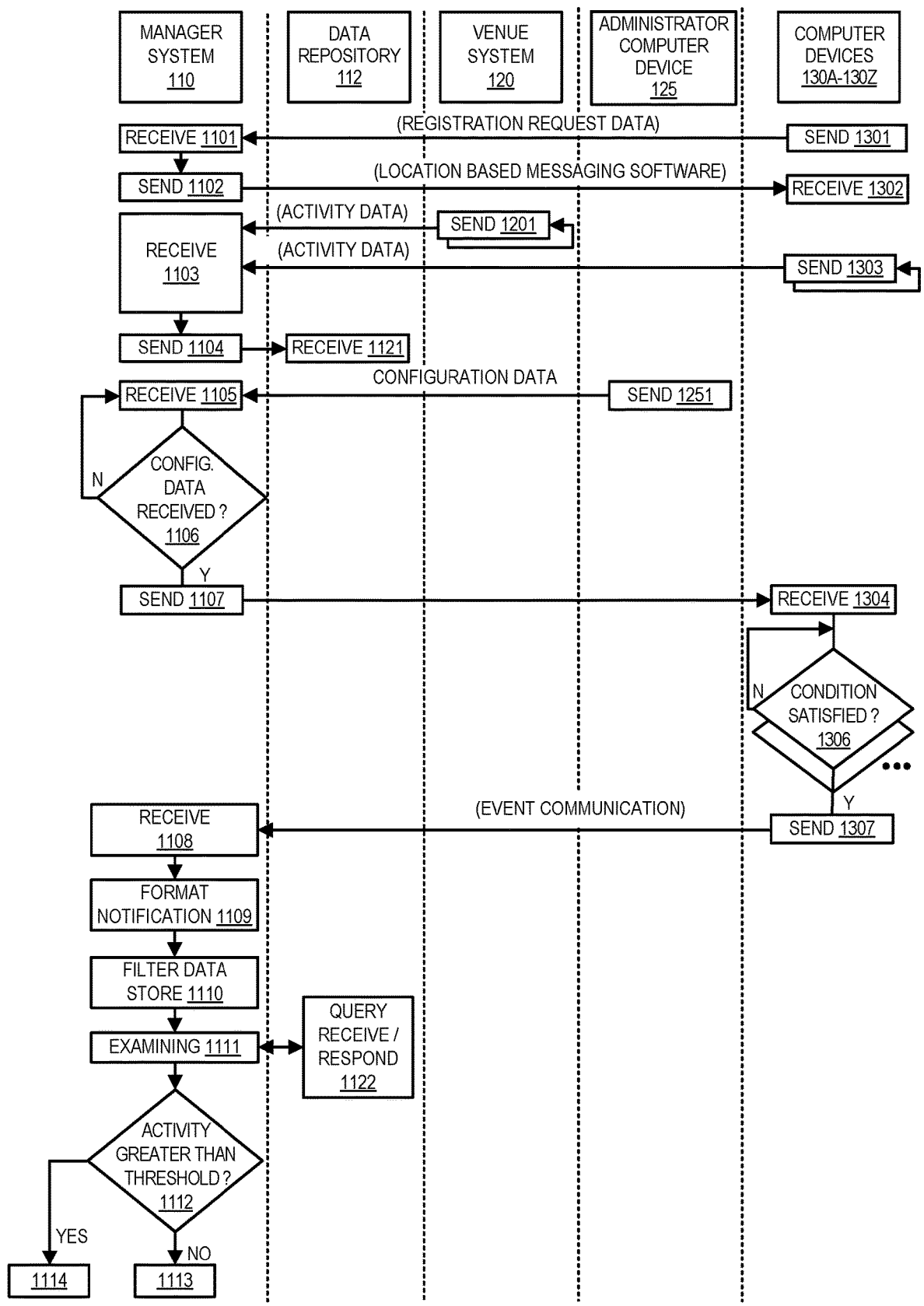
FIGS. 4A-4B is flowchart illustrating a method that can be performed by a manager system interoperating with other components according to one embodiment.
Figure 4B:
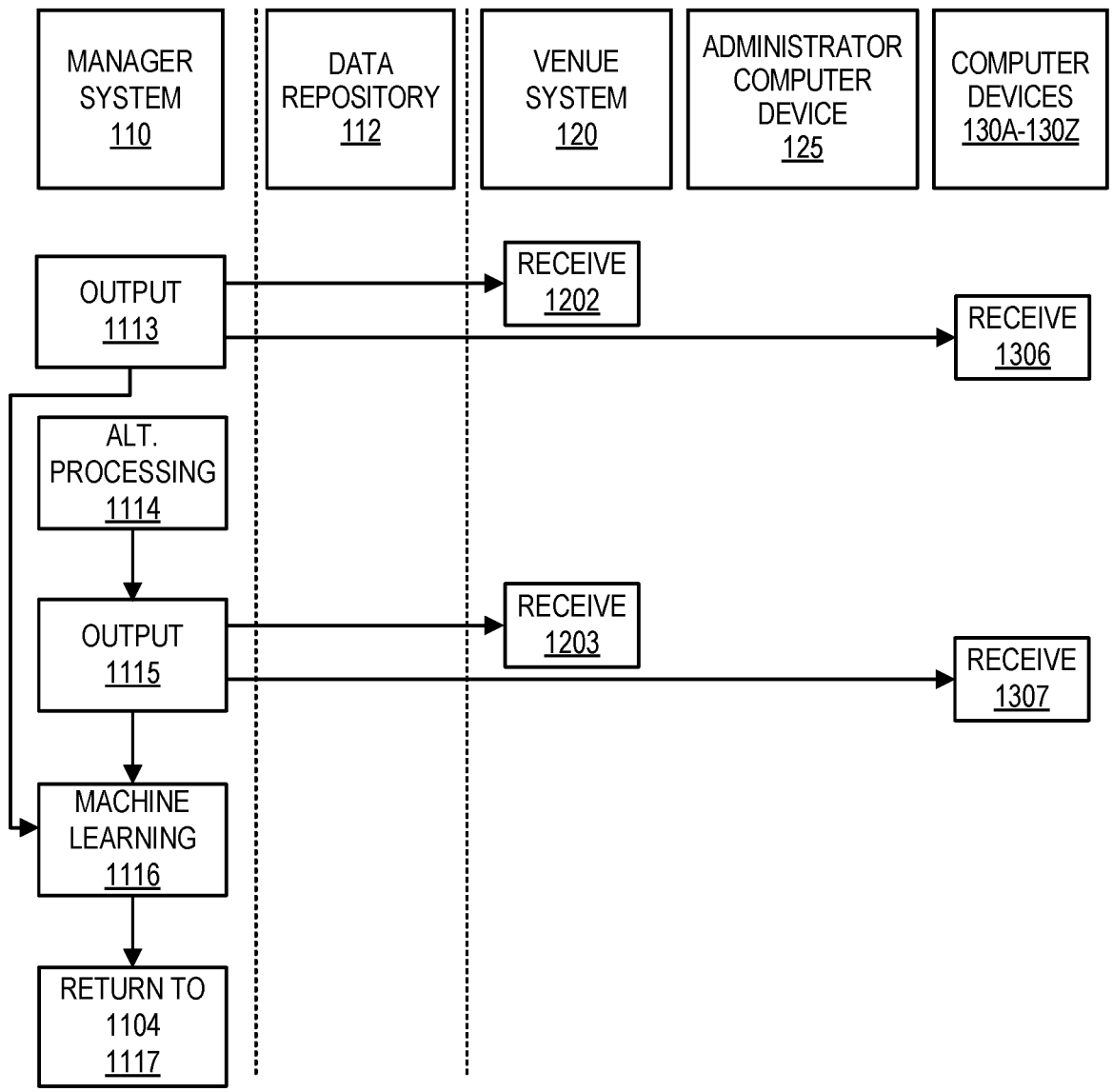

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 300 of FIG. 3 and functions described with reference to method 300 of FIG. 3 and functions described with reference to manager system 110 as set forth in the flowchart of FIG. 4A-4B. In one embodiment, one or more user computer device 130A-130Z can include one or more computing node 10 and can include one or more program 40 for performing functions described with reference to one or more user computer device 130A-130Z as set forth in the flowchart of FIG. 4A-4B. In one embodiment, the various computing node based devices and systems of FIG. 1 can include one or more program for performing their associated described functionalities.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20.

As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a heartrate sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for specified location activity determinations and associated processes as set forth herein. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   determining that a location based event has occurred, the location based event pertaining to a certain user computer device;
   identifying, based on the determining, a notification for sending to the certain user computer device, wherein the notification has an associated destination location;
   examining an activity level of the destination location; and
   based on the activity level exceeding a threshold, providing one or more output, wherein the one or more output provided based on the activity level exceeding the threshold includes an output to suppress sending the notification, and an output that initiates monitoring the activity level of the destination location and sends the notification to the certain user computer device after a delay based on the activity level falling below the threshold.

2. A computer program product comprising:
   a computer readable storage medium readable by one or more processing circuit and storing instructions for execution by one or more processor for performing a method comprising:
   determining that a location based event has occurred, the location based event pertaining to a certain user computer device;
   identifying, based on the determining, a notification for sending to the certain user computer device, wherein the notification has an associated destination location;
   examining an activity level of the destination location; and
   based on the activity level exceeding a threshold, providing one or more output.

3. A method comprising:
   determining that a location based event has occurred, the location based event pertaining to a certain user computer device;
   identifying, based on the determining, a notification for sending to the certain user computer device, wherein the notification has an associated destination location;
   examining an activity level of the destination location; and
   based on the activity level exceeding a threshold, providing one or more output.

4. The method of claim 3, wherein the one or more output includes an output to suppress sending the notification to the certain computer device.

5. The method of claim 3, wherein the threshold is custom threshold for the certain user of the certain user computer, and wherein the method includes determining the custom threshold for the certain user using biometric data of the certain user.

6. The method of claim 3, wherein the one or more output includes an output to suppress sending the notification, and an output to initiate an alternate process, the alternate process including monitoring the activity level of the destination location and sending the notification based on the activity level falling below the threshold.

7. The method of claim 3, wherein the one or more output includes an output to suppress sending the notification, and an output to initiate an alternate process, the alternate process including monitoring the activity level of the destination location.

8. The method of claim 3, wherein the one or more output includes an output to suppress sending the notification, and an output to initiate an alternate process, the alternate process including sending the notification after a delay based on a condition being satisfied.

9. The method of claim 3, wherein the one or more output includes an output to suppress sending the notification, and an output to initiate an alternate process, the alternate process including sending an alternate notification to the certain user computer device, the alternate notification prompting the certain user to travel in a manner to avoid the destination location.

10. The method of claim 3, wherein the one or more output is an output to activate an alternate process, wherein the alternate process includes examining an activity level of an alternate destination location spaced apart from the destination location, and sending an alternate notification based on a result of the examining of the activity level at the alternate location.

11. The method of claim 3, wherein the one or more output includes an output to initiate a process for physiologically monitoring of the certain user using a biometric sensor output of the user's computer device.

12. The method of claim 3, wherein the destination location is expressly referenced in text content of the notification, and wherein the examining includes activating a natural language processing (NLP) process to extract the destination location expressly referenced in text content of the notification and using table lookup to ascertain a coordinate location of the destination location.

13. The method of claim 3, wherein the notification is a text based notification that is absent text content that expressly references the destination location, wherein the method includes activating a natural language processing (NLP) process to extract a topic from the notification and using table lookup to ascertain a coordinate location of the destination location based on the extracted topic.

14. The method of claim 3, wherein the method includes prior to the determining that a location based event has occurred (a) monitoring user traffic resulting from a certain notification, determining based on the monitored traffic that there is a destination associated with the certain notification, recording the certain notification and a certain coordinate location of the destination into a lookup table, and wherein the method further includes, subsequent the determining that the location based event has occurred, (b) using the lookup table to determine, based on a matching between the notification and the certain notification, that a coordinate location of the destination location of the notification is the certain coordinate location.

15. The method of claim 3, wherein the examining the activity level includes applying a function having a plurality of factors and weights associated, respectively, to factors of the plurality of factors, wherein each factor of the plurality of factors is selected from the group consisting of (a) F1, wherein F1 is an activity level scoring factor based on a number of devices at the destination location, (b) F2, wherein F2 is a computer device movement scoring factor, (c) F3, wherein F3 is a computer device motion scoring factor, (d) F4, wherein F4 is a person count factor.

16. The method of claim 3, wherein the method includes determining the activity level in dependence on a number of devices at the destination location.

17. The method of claim 3, wherein the method includes determining the activity level in dependence on coordinate location changes of devices at the destination location over time.

18. The method of claim 3, wherein the method includes determining the activity level in dependence on body actions of users at the destination location over time, wherein the body actions are determined using sensor outputs of devices of the users.

19. The method of claim 3, wherein the method includes determining the activity level in dependence on a count of persons at the destination location, wherein the count of persons includes using camera image data image recognition, the camera data obtained using one or more camera disposed to obtain camera image data representing the destination location.

* * * * *